United States Patent
Jain et al.

(10) Patent No.: US 10,920,607 B2
(45) Date of Patent: Feb. 16, 2021

(54) METALLIC COMPLIANT TIP FAN BLADE

(71) Applicant: General Electric Company, Schenectady, NY (US)

(72) Inventors: Nitesh Jain, Bangalore (IN); Kishore Budumuru, Bangalore (IN); Nicholas Joseph Kray, Mason, OH (US); Daniel Edward Mollmann, Mason, OH (US)

(73) Assignee: General Electric Company, Schenectady, NY (US)

( * ) Notice: Subject to any disclaimer, the term of this patent is extended or adjusted under 35 U.S.C. 154(b) by 104 days.

(21) Appl. No.: 16/145,759

(22) Filed: Sep. 28, 2018

(65) Prior Publication Data

US 2020/0102853 A1 Apr. 2, 2020

(51) Int. Cl.
*F01D 5/14* (2006.01)
*F01D 21/04* (2006.01)
*F01D 5/18* (2006.01)

(52) U.S. Cl.
CPC ........... *F01D 21/045* (2013.01); *F01D 5/147* (2013.01); *F01D 5/18* (2013.01); *F05D 2240/307* (2013.01)

(58) Field of Classification Search
CPC .......... F01D 21/045; F01D 5/147; F01D 5/18; F05D 2240/307
See application file for complete search history.

(56) References Cited

U.S. PATENT DOCUMENTS

| | | | | |
|---|---|---|---|---|
| 5,232,344 A | * | 8/1993 | El-Aini | ..................... F01D 5/16 416/145 |
| 5,634,771 A | * | 6/1997 | Howard | .................. F01D 5/147 416/229 R |
| 5,947,688 A | * | 9/1999 | Schilling | ................. F01D 5/147 416/233 |

(Continued)

FOREIGN PATENT DOCUMENTS

| | | |
|---|---|---|
| CN | 1637246 | 7/2005 |
| CN | 101718227 | 6/2010 |

(Continued)

OTHER PUBLICATIONS

United States Patent and Trademark Office, "Non-Final Office Action," issued in connection with U.S. Appl. No. 16/145,656, dated Apr. 1, 2020, 12 pages.

(Continued)

*Primary Examiner* — Aaron R Eastman
(74) *Attorney, Agent, or Firm* — Hanley, Flight & Zimmerman, LLC (57) ABSTRACT

A blade for a propulsion apparatus. The blade includes a body having opposed pressure and suction sides. The blade extends in span between a root and a tip and the blade extends in chord between a leading edge and a trailing edge. The blade includes a fracture structure that is defined within the body and positioned such that it is spaced-away from the tip. The fracture structure includes at least one chamber. A first fracture wall is disposed between the at least one chamber and the pressure side, and a second fracture wall is (Continued)

disposed between the at least one chamber and the suction side. The fracture structure is configured to fail when a predetermined force is applied to the tip such that the tip separates from the remainder of the body.

20 Claims, 6 Drawing Sheets

(56) References Cited

U.S. PATENT DOCUMENTS

| | | | |
|---|---|---|---|
| 6,033,186 A * | 3/2000 | Schilling | B63H 1/26 |
| | | | 416/233 |
| 6,039,542 A * | 3/2000 | Schilling | F01D 5/16 |
| | | | 416/224 |
| 6,491,497 B1 | 12/2002 | Allmon et al. | |
| 7,114,912 B2 * | 10/2006 | Gerez | F01D 5/147 |
| | | | 415/9 |
| 7,780,410 B2 | 8/2010 | Kray et al. | |
| 7,780,420 B1 | 8/2010 | Matheny | |
| 8,083,489 B2 * | 12/2011 | Viens | F04D 29/023 |
| | | | 416/229 R |
| 8,585,368 B2 * | 11/2013 | Viens | F01D 5/147 |
| | | | 416/191 |
| 8,821,124 B2 * | 9/2014 | Viens | F01D 5/147 |
| | | | 416/191 |
| 8,840,361 B2 | 9/2014 | Bottome | |
| 9,003,657 B2 | 4/2015 | Bunker et al. | |
| 9,021,696 B2 | 5/2015 | Jakimov et al. | |
| 9,133,712 B2 | 9/2015 | Fisk et al. | |
| 9,175,568 B2 | 11/2015 | Ryan et al. | |
| 9,260,784 B2 | 2/2016 | Jakimov et al. | |
| 9,850,767 B2 | 12/2017 | Guo et al. | |
| 9,879,559 B2 | 1/2018 | Fisk et al. | |
| 9,926,794 B2 | 3/2018 | Strock | |
| 2011/0211965 A1 * | 9/2011 | Deal | F01D 5/147 |
| | | | 416/223 R |
| 2014/0050589 A1 | 2/2014 | Viens et al. | |
| 2015/0064019 A1 | 3/2015 | Lacy et al. | |
| 2015/0204347 A1 | 7/2015 | Strock et al. | |
| 2015/0321289 A1 | 11/2015 | Bruck et al. | |
| 2015/0322800 A1 | 11/2015 | Crosatti et al. | |
| 2015/0337671 A1 | 11/2015 | Strock et al. | |
| 2016/0003083 A1 | 1/2016 | Delisle et al. | |
| 2016/0053625 A1 | 2/2016 | Fisk et al. | |
| 2016/0069184 A1 | 3/2016 | Ribic et al. | |
| 2016/0245110 A1 | 8/2016 | Stock et al. | |
| 2018/0171802 A1 | 6/2018 | Lacy et al. | |
| 2019/0277156 A1 * | 9/2019 | Negri | F01D 21/02 |

FOREIGN PATENT DOCUMENTS

| | | |
|---|---|---|
| CN | 101864993 | 10/2010 |
| CN | 102287401 | 12/2011 |
| CN | 103089317 | 5/2013 |
| CN | 106536089 | 3/2017 |
| EP | 2243929 | 10/2010 |
| GB | 2327467 | 1/1999 |
| JP | 2000087897 | 3/2000 |

OTHER PUBLICATIONS

Chinese Patent Office, "First Office Action and Search Report," issued in connection with Chinese Patent Application No. 201910922856.7, dated Jul. 17, 2020, 17 pages. English abstract included.

Chinese Patent Office, "First Office Action and Search Report," issued in connection with Chinese Patent Application No. 201910922839.3, dated Jul. 17, 2020, 19 pages. English translation included.

* cited by examiner

METALLIC COMPLIANT TIP FAN BLADE

BACKGROUND OF THE INVENTION

This invention relates to turbofan blades and turbofan containment casings. More specifically it relates to fan blades which are compliant or fusible at their tips in order to prevent damage to a surrounding casing.

A gas turbine engine includes a turbomachinery core having a high-pressure compressor, a combustor, and a high-pressure turbine in a serial flow relationship. The core is operable in a known manner to generate a primary flow of propulsive gas. A typical turbofan engine adds a low-pressure turbine driven by the core exhaust gases which in turn drives a fan rotor through a shaft to generate a bypass flow of propulsive gas. In the case of a high bypass engine this provides the majority of the total engine thrust.

The fan rotor includes a fan that includes an array of fan blades extending radially outward from a fan disk. The fan blades are positioned radially inward of a shroud and are configured to clear the shroud during normal operating conditions. However, during operation of the engine, a fragment of a fan blade may contact the shroud and fail. As a result, a substantial rotary unbalance load may be created.

Such a rotary unbalance will cause substantial fan gyrations. Such fan gyrations can cause significant damage to the engine. Conventionally, damaging fan gyrations were accommodated by use of a containment structure that included trench filler. Conventionally, such trench filler can be about 2 to 3 inches thick and formed of a metallic honeycomb. One problem with this solution is that trench filler is heavy and can cause engine inefficiencies.

BRIEF DESCRIPTION OF THE INVENTION

This problem is addressed by providing a turbofan engine that includes a fan blade configured to fail in a limited manner, more specifically the fan blade is configured such that the tip separates from the body of the fan blade quickly upon contact with a shroud.

According to one aspect, a blade for a propulsion apparatus includes a body having opposed pressure and suction sides. The blade extends in span between a root and a tip and the blade extends in chord between a leading edge and a trailing edge. The blade includes a fracture structure that is defined within the body and positioned such that it is spaced-away from the tip. The fracture structure includes at least one chamber. A first fracture wall is disposed between the at least one chamber and the pressure side, and a second fracture wall is disposed between the at least one chamber and the suction side. The fracture structure is configured to fail when a predetermined force is applied to the tip such that the tip separates from the remainder of the body.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
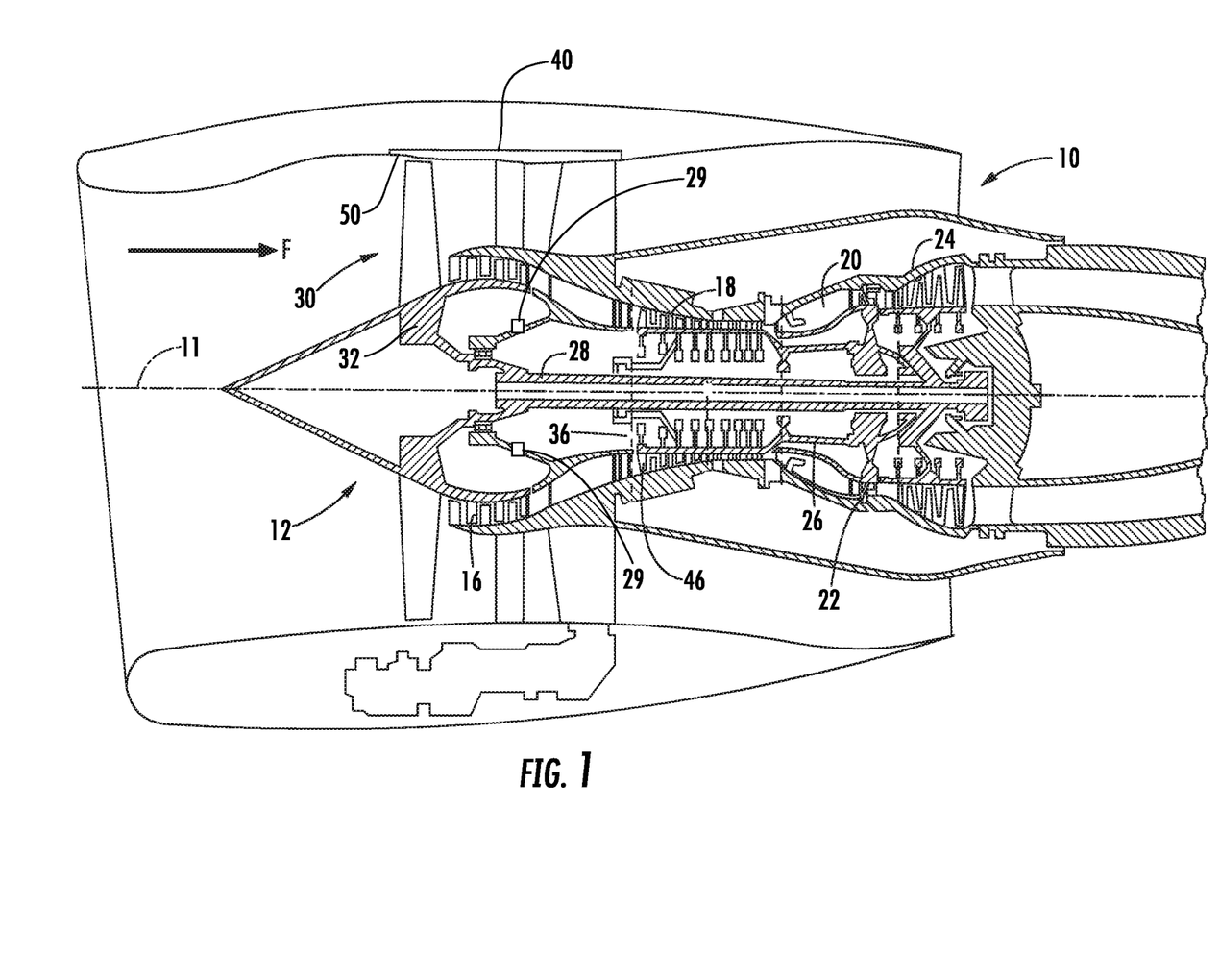
FIG. 1 is a schematic cross-sectional view of a gas turbine engine.
Figure 2:
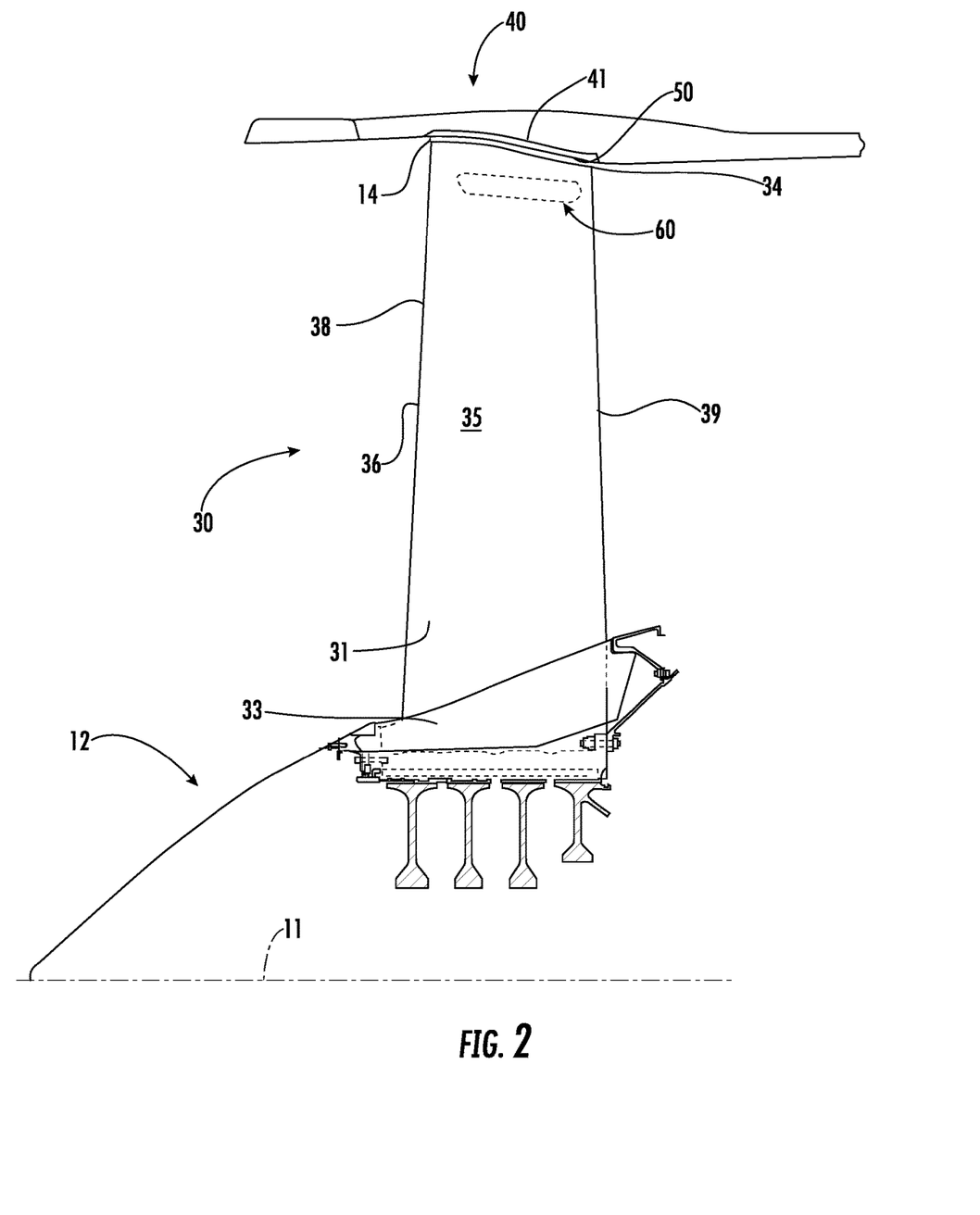
FIG. 2 is an enlarged view of a portion of the gas turbine engine of FIG. 1, showing a fan blade and a portion of a fan hub and shroud.

Referring to the drawings wherein identical reference numerals denote the same elements throughout the various views, FIG. 1 depicts an exemplary gas turbine engine 10 that includes a propulsion apparatus. While the illustrated example is a high-bypass turbofan engine, the principles of the present invention are also applicable to other types of engines, such as low-bypass turbofans, turbojets, turboprops, etc. The engine 10 has a longitudinal center line or axis 11.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and radial directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 12, booster 16, compressor 18, combustor 20, high pressure turbine or "HPT" 22, and low-pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high-pressure turbine 22 which drives the compressor 18 via an outer shaft 26. The combustion gases then flow into the low-pressure turbine 24, which drives the fan 12 and booster 16 via an inner shaft 28.

The fan 12 is one example of a propulsion apparatus. It will be understood that the principles described herein are applicable to other kinds of propulsion apparatus operable to produce propulsive thrust, such as ducted propellers or compressors. Instead of a gas turbine engine, the fan 12 or other propulsion apparatus could be driven by another type of prime mover such as: heat engines, motors (e.g. electric, hydraulic, or pneumatic), or combinations thereof (for example electric hybrid drivetrains). The propulsion apparatus may be driven directly by a prime mover, or through an intermediate geartrain.

A plurality of mechanical fuses 29 are positioned mechanically between the fan 12 and the shaft 28. The mechanical fuses 29 are configured to transfer rotational energy from the shaft 28 during normal operation. High radial forces may cause a mechanical fuse 29 to fail thus allowing the fan 12 to rotate about a new axis of rotation. The mechanical fuse 29 is referred to as a load reduction device, or LRD.

In the configuration shown in FIGS. 2-6, fan 12 includes a plurality of fan blades 30. The fan blades 30 are mounted to a fan disk 32 (shown in FIG. 1) and each includes a body 31. Each fan blade extends from a root 33 to a tip 34 and has a pressure side 35, a suction side 36, a leading-edge 38 and a trailing edge 39.

Figure 7:
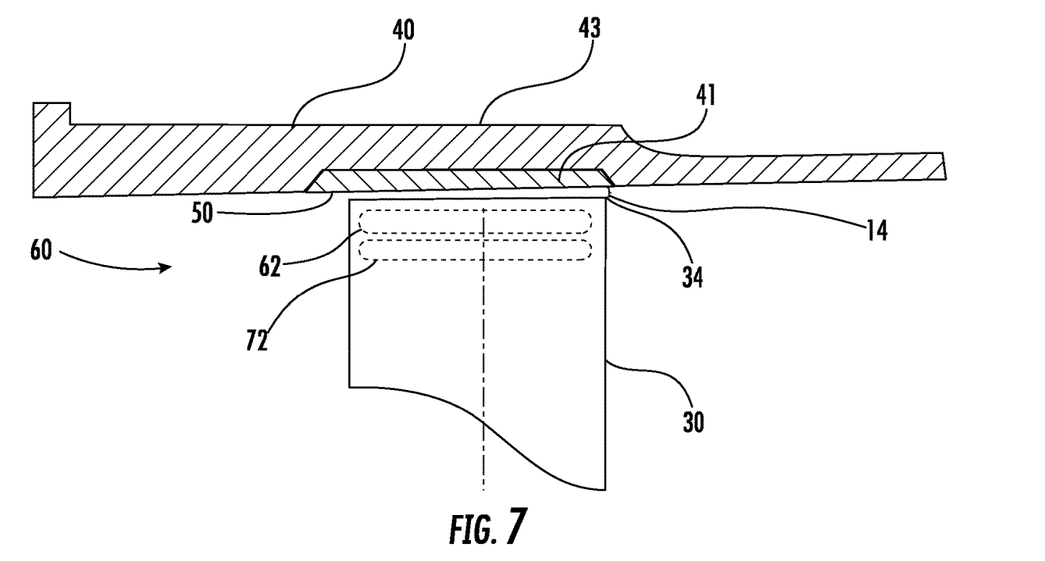
FIG. 7 is a sectional view of a portion of the fan blade showing its relative position to a portion of a shroud.
Figure 8:
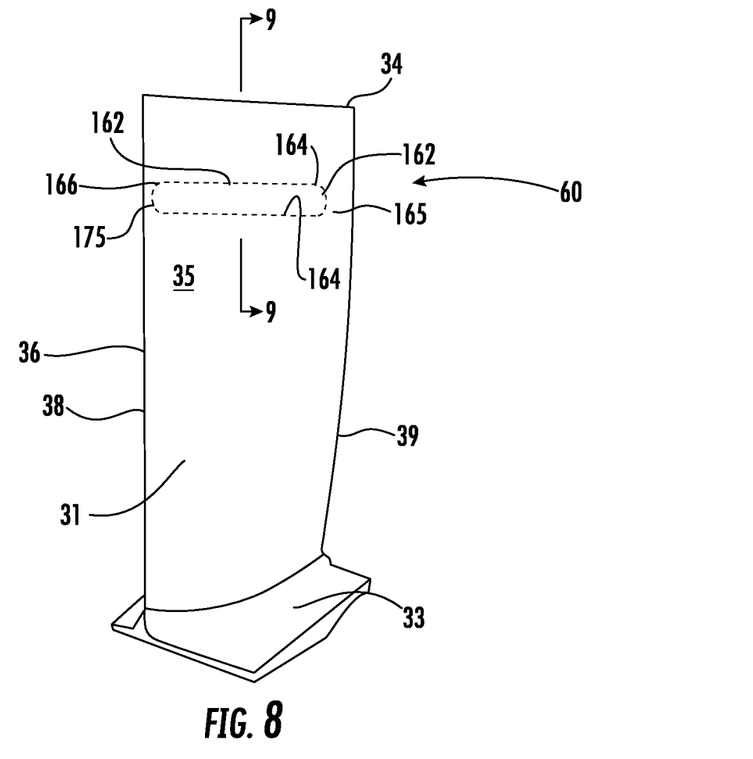
FIG. 8 is a perspective view of a fan blade according to another embodiment of the present invention.
Figure 9:
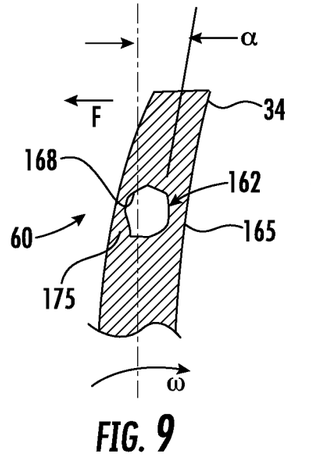
FIG. 9 is a sectional view of a portion of the fan blade of FIG. 8 taken at line 9-9.
Figure 10:
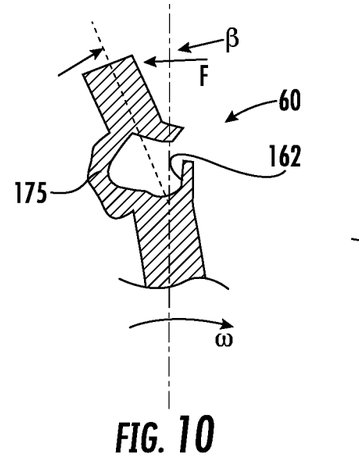
FIG. 10 is a sectional should view of a portion of the fan blade of FIG. 8 taken at line 9-9 during a failure mode.
Figure 11:
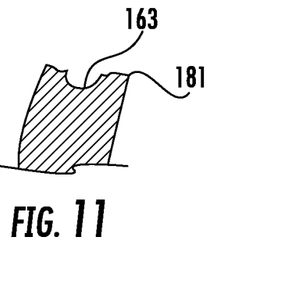
FIG. 11 is a sectional view of a portion of the fan blade of FIG. 8 after failure has occurred.

As shown in FIG. 7, the fan casing 40 includes an inner annular surface 50. The inner annular surface 50 has a generally circular cross-section and defines an inner diameter of the inner casing 40. The inner annular surface 50 is configured to channel the incoming air through the fan 12 so as to ensure that the fan 12 will compress the bulk of the air entering the engine 10. By way of example and not limitation, the fan casing 40 can be made of the following: a metal, a composite material, and a combination thereof.

As shown in FIG. 7, the inner casing 40 includes a thin layer of shroud material 41 positioned adjacent to a blade tip path defined by the blades 30 of the fan 12. The shroud material 41 is supported by a containment structure 43. According to the illustrated embodiment, the containment structure 43 is generally solid and is not configured as a honeycomb structure or as other trench filler material such as that found in conventional fan castings. Instead the casing 40 consists essentially of a solid metal containment structure 43 and the shroud material 41.

A small radial gap 14 is present between the tips 34 of the fan blades 30 and the inner annular surface 50. It is this clearance, i.e., the radial gap 14, that is minimized in order to promote the efficiency of the engine 10.

Referring now to FIGS. 3-6, the blade 30 includes a fracture structure 60 that is configured to provide for the detachment of tip 34 if contact occurs between annular surface 50 and one of tips 34. In other words, the blade 30 is configured to be compliant and fail in a limited manner such that further catastrophic contact will not occur if the radial gap 14 is not maintained. In this regard, the body 31 of the blade 30 defines the fracture structure 60. The fracture structure 60 is spaced-away from the tip 34 and is positioned parallel to the chord of the blade 30. In this regard, the fracture structure 60 is oriented such that when the fracture structure 60 fails, the tip 34 of the blade 30 folds across the body 31 of the blade 30 along the chord. Preferably the tip 34 folds parallel to the chord but in other embodiments, the tip 34 does not fold parallel to the chord but folds sufficient to clear the inner annular surface 50.

Figure 3:
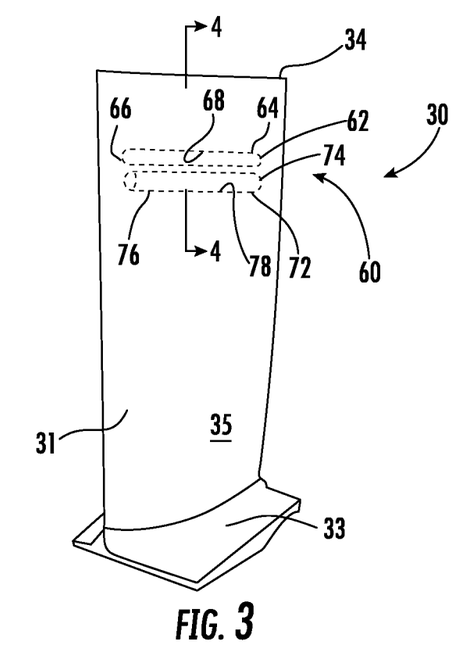
FIG. 3 is a perspective view of a fan blade according to the present invention.
Figure 4:
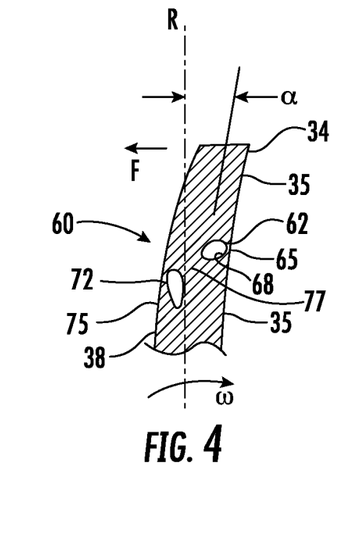
FIG. 4 is a sectional view of a portion of the fan blade of FIG. 3 taken at line 4-4.

As shown in FIGS. 3 and 4, the fracture structure 60 includes a first elongated chamber 62 and a second elongated chamber 72. The first elongated chamber 62 and the second elongated chamber 72 can be radially offset as shown in FIG. 3 such that chamber 62 is closer to the tip 34 than the second chamber 72, i.e., staggered. In other embodiments, the first chamber 62 and second chamber 72 can be equally spaced-away from the tip 34.

The first chamber 62 includes a first end 64 and extends to a second end 66. The body 31 defines a surface 68 of the first chamber 62. The surface 68 can define a round cross-section, an oval cross-section, or cross-section of other suitable shape. Referring now to FIG. 4, the first chamber 62 is spaced-away from a first pressure side 35 of the blade 30. The region of the blade body 31 that is positioned between the first chamber 62 and the pressure side 35 is a first fracture wall 65. The thickness of the first fracture wall 65 is defined by the shortest distance between the surface 68 of the first chamber 62 and the pressure side 35.

The first chamber 62 and the second chamber 72 are substantially similar such that the second chamber 72 can be understood from the description of the first chamber above. To summarize, the second chamber 72 includes a first end 74 and extends to a second end 76. The body 31 defines a surface 78 of the second chamber 72. The second chamber 72 in conjunction with the suction side 36 defines a second fracture wall 75. The second fracture wall 75 and the first fracture wall 65 are both surface fracture walls.

As indicated above, the first fracture chamber 62 is spaced-away from the second fracture chamber 72. The region of the body 31 positioned between the first fracture chamber 62 and the second fracture chamber 72 defines a medial fracture wall 77. The thicknesses of the first fracture wall 65, the second fracture wall 75, and the medial fracture wall 77 are predetermined to provide sufficient strength to the blade 30 during normal operation. The predetermined thicknesses are such that in a failure mode when the blade tips 34 contact the inner annular surface 50 the first fracture wall 65, the second fracture wall 75, and the medial fracture wall 77 fail in a prescribed manner as will be described below.

As shown in FIG. 4, the blade 30 is positioned with a forward rake of an angle α relative to a radial line R. The blade 30 is configured to rotate in the forward direction a).

Figure 5:
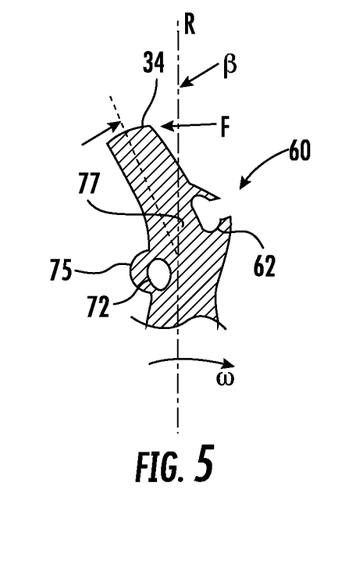
FIG. 5 is a sectional view of a portion of the fan blade of FIG. 3 taken at line 4-4 during a failure mode.
Figure 6:
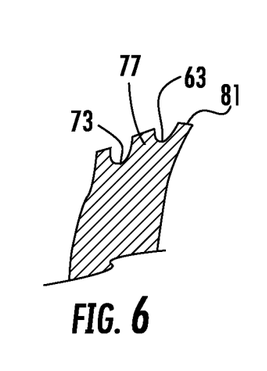
FIG. 6 is a sectional view of a portion of the fan blade of FIG. 3 after failure has occurred.

FIG. 5 shows deformation of the blade 30 by failure of the fracture structure 60. The blade 30 is deflected at an angle β which is opposite to angle α relative to the radial line R. FIG. 6 shows the blade 30 after failure has occurred. The blade 30 has been deformed such that it is spaced further apart from the surface 50 than the distance defined by gap 14. In this regard, the first fracture wall 65, the second fracture wall 75, and the medial fracture wall 77 are no longer intact. The tip 34 of the blade 30 is detached from the remainder of the body 31 of the blade 30. The failure of the first fracture wall 65, second fracture wall 75, and the medial fracture wall 77 define a failure tip 81 along with a first remnant surface 63 of the first chamber 62 and the second remnant surface 73 of the second chamber 72. It should be appreciated that the failure tip 81 is spaced-away from the surface 50.

The blade 30 is preferably formed of a material which can be formed with internal chambers such as metal. By way of example, the metal can be titanium, steel, nickel, cobalt, and alloys thereof.

The present invention can be better understood from a description of the operation thereof. During normal operation, the fan 12 rotates in the forward direction ω. During a failure mode, such as LRD, the tips 34 contact the surface 50 such that force F is applied to the tip 34 in the opposite direction to a). As a result, the tip 34 is deflected away from the original orientation as represented in FIG. 5. When the deflection of the tip 34 reaches a predetermined value, the fracture structure 60 fractures in a predetermined manner. In this regard, the first fracture wall 65 fails, resulting in a shifting of forces and continuing deflection of the tip 34 that causes the medial fracture wall 77 to fail and the second fracture wall 75 to fail.

By way of example, a typical failure mode occurs when the LRD mechanical fuse 29 fails. As indicated above, the fan 12 rotates about a new axis. The new rotation can cause blades 30 to contact the surface 50. Such contact would initiate fracturing of the fracture structure 60.

Referring now to FIGS. 8-11, there is shown an alternative embodiment in which the fracture structure 60 includes a single elongated chamber 162. The chamber 162 includes a first end 164 and extends to a second end 166. The body 31 defines a surface 168 of the chamber 162. The surface 168 can define a round cross-section, an oval cross-section, or cross-section of other suitable shape. Referring now to FIG. 4, the chamber 162 is spaced-away from the pressure side 35 and the suction side 36 of the blade 30. The chamber 162 and the pressure side 35 define a first fracture wall 165. The chamber 162 and the suction side 36 define a second fracture wall 175.

The operation of the fracture structure 60 that includes a single elongated chamber 162 is similar to the operation of the fracture structure 60 that includes a first elongated chamber 62 and a second elongated chamber 72 as described above.

Referring now to FIGS. 12-15, there is shown another alternative embodiment in which elements associated with reference numbers in the 200 series can be understood from the description above of elements associated with the analogous numbers in the zero series. In the configuration shown in FIGS. 12-15, fan 12 includes a plurality of fan blades 230. The fan blades 230 are mounted to a fan disk (analogous to the fan disk 12 shown in FIG. 1) and each includes a body 231. Each fan blade extends from a root 233 to a tip 234 and has a pressure side 235, a suction side 236, a leading-edge 238 and a trailing edge 237. The blade 230 defines a first length L from the root 233 to the tip 234.

Figures 12, 13, 14, 15:
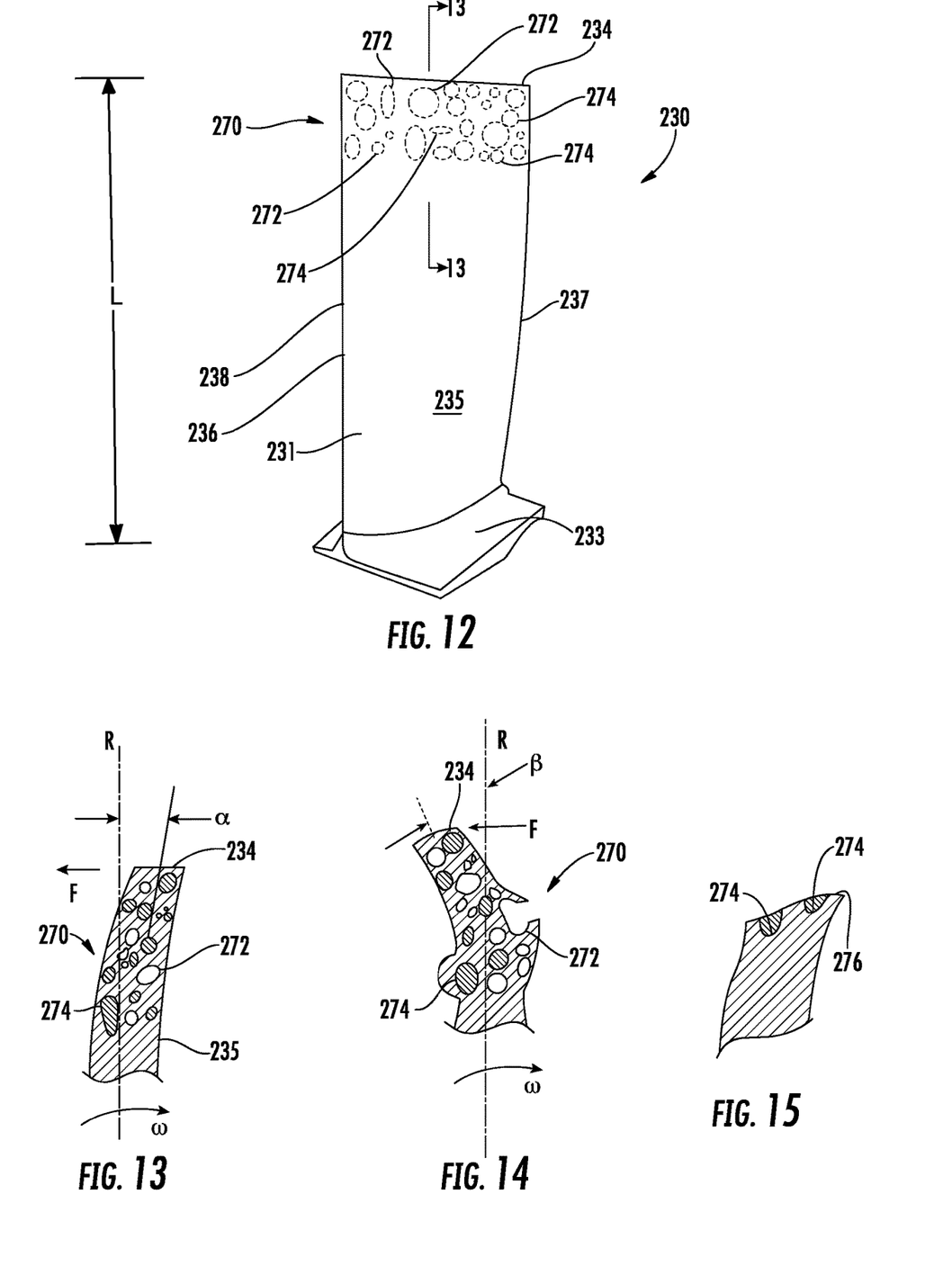
FIG. 12 is a perspective view of a fan blade according to the another alternative embodiment of present invention.
FIG. 13 is a sectional view of a portion of the fan blade of FIG. 12 taken at line 13-13.
FIG. 14 is a sectional view of a portion of the fan blade of FIG. 12 taken at line 13-13 during a failure mode.
FIG. 15 is a sectional view of a portion of the fan blade of FIG. 12 after failure has occurred.

The blade 230 further includes fracture structure 270 that defines a metallic blade tip 234. The fracture structure 270 is configured as a region of intentional porosity for fusibility. The fracture structure 270 begins about 85% of the length L. As shown in the illustrated embodiment, the fracture structure 270 can be defined such that it continues to the blade tip 34. Optionally, a region of intentional porosity can be defined so that is spaced away from the blade tip 234 and thus does not occupy all of region occupied by the fracture structure 270. The fracture structure 270, i.e. the region of intentional porosity, is configured to fuse at the design load as described above. As used herein, the term fuse refers to a failure or separation in a predetermined manner.

The fracture structure 270 is arranged in such a way that will help the blade 230 to bend and eventually fuse at a predetermined location. The blade 230 and the fracture structure 270 are configured such that the blade tip 234 does not separate from the remainder of the blade 230 in light rub conditions like crosswinds or under medium flocking bird impact. The blade 230 and the fracture structure 270 are configured such that the blade 230 fails, i.e. fuses, under heavy rub resulting from events like FBO, large bird ingestion, etc.

The region of intentional porosity is defined by a plurality of first chambers 272 and second chambers 274. The first chambers 272 and second chambers 274 are positioned within the fracture structure 270 of the blade 230. The chambers 272 and 274 can be variously shaped and randomly distributed. The second chambers 274 are filled with a filler material. The filler material is a second material relative to the metal material that makes up the blade body 231 which is a first material. The second material can be a metal. The second material is selected to be weaker than the first material. By way of example and not limitation, the first material can be titanium (Ti) and of the second material can be aluminum (Al). The modulus of titanium is about 1.66E7 psi. Thus, the yield of the first material is between about 118 KSI and 130 KSI. The modulus of aluminum is about 1.02E7 psi. Thus, the yield of the second material is between about 40 KSI and about 60 KSI. The first chambers 272 are not filled with material and thus define voids.

In summary, the plurality of chambers within the fracture structure 270 can be hollow or filled with more compliant (weak) material. The fracture structure 270 thus has intentional random porosity cavities that are configured to reduce stiffness of the tip. The structure can be enabled through additive manufacturing. An advantage of this embodiment is that it helps reduce the overall weight and cost of the fan module significantly.

The operation of this alternative embodiment is similar to the operation of the embodiments described above. FIG. 13 shows a portion of the blade 230 according to the alternative embodiment in normal operation. FIG. 14 shows a portion of the blade 230 as it deforms during contact with another structure. FIG. 15 shows a portion of the blade 230 after failure of the fracture structure 270 which results in a tip remnant 276.

The advantage of a fan blade configured to fail in a limited manner in response to catastrophic contact with the containment case is that the containment case may be built with less trench filler material or honeycomb. This is a result of the fact that the amount of force that can be imparted to the containment case by the blade is limited by the predetermined strength of the fracture walls. By failing quickly in a limited and predetermined manner, the remainder of the blade without the tip is likely to remain intact. The debris that is likely to contact other components is just a small amount released with the tip.

The foregoing has described an apparatus, i.e., a fan blade that includes a fracture structure that is configured to provide sufficient operating strength for normal operating conditions, and to fail when a predetermined load is applied to the tip of the blade. The fracture structure is configured to fail such that the tip of the blade quickly detaches from the remaining body of the blade. In this manner, the remaining body of the blade remains intact and does not contact the containment structure.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not limited to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A blade for a propulsion apparatus, comprising:
    a body formed of a first material having opposed pressure and suction sides, and extending in span between a root and a tip, and extending in chord between a leading edge and a trailing edge;

a fracture structure defined within the body and positioned near the tip; and wherein the fracture structure includes a plurality of chambers defining a region of intentional porosity in the fracture structure, each of the chambers configured to reduce stiffness of the tip to allow the tip to fold across the body of the blade during failure of the fracture structure;

wherein the fracture structure includes a first fracture wall disposed between at least one chamber and the pressure side, and a second fracture wall disposed between the at least one chamber and the suction side; and wherein the fracture structure is configured to fail when a predetermined force is applied to the tip such that the tip separates from a remainder of the body.

2. The blade according to claim 1, wherein the at least one chamber includes a first chamber and a second chamber spaced-away from the first chamber.

3. The blade according to claim 2, wherein the first fracture wall is defined between the first chamber and the pressure side, and the second fracture wall is defined between the second chamber and the suction side.

4. The blade according to claim 3, wherein a medial fracture wall is defined within the body between the first chamber and the second chamber.

5. The blade according to claim 2, wherein the first chamber and the second chamber are positioned at different distances from the tip.

6. The blade according to claim 1, wherein the body is metal.

7. The blade according to claim 1, wherein the at least one chamber is elongated parallel to the chord of the body.

8. The blade according to claim 1, wherein the fracture structure is spaced away from the tip.

9. The blade according to claim 1, wherein the at least one chamber includes a plurality of spaced apart chambers.

10. The blade according to claim 9, wherein the plurality of spaced apart chambers are randomly sized.

11. The blade according to claim 9, wherein the plurality of spaced apart chambers are randomly shaped.

12. The blade according to claim 9, wherein at least one of the chambers is a filled chamber that includes a second material and the second material is different than the first material.

13. The blade according to claim 12, wherein the second material is a metal.

14. The blade according to claim 13, wherein the first material is titanium and the second material is aluminum.

15. The blade according to claim 13, wherein the first material has a modulus of 1.66E7 psi and the second material has a modulus of 1.02E7 psi.

16. The apparatus according to claim 15, wherein a containment structure includes no trench filler material.

17. The apparatus according to claim 15, wherein the body is formed of a first material and at least one of the chambers is filled with a second material that is weaker than the first material.

18. The apparatus according to claim 15, wherein the body is formed of a metal.

19. The blade according to claim 13, wherein the first material has a yield of between 118 KSI and 130 KSI and the second material has a yield of between 40 KSI and about 60 KSI.

20. A gas turbine engine apparatus, comprising:
a turbomachinery core;
a fan coupled in driven relationship with the turbomachinery core, the fan including:
  a plurality of blades positioned around a disk, each blade including:
    a body formed of a first material having opposed pressure and suction sides, and extending in span between a root and a tip, and extending in chord between a leading edge and a trailing edge;
    a fracture structure defined within the body and positioned near the tip; and
    wherein the fracture structure includes a plurality of chambers defining a region of intentional porosity in the fracture structure, each of the chambers configured to reduce stiffness of the tip to allow the tip to fold across the body of the blade during failure of the fracture structure;
    wherein the fracture structure includes a first fracture wall disposed between at least one chamber and the pressure side, and a second fracture wall disposed between the at least one chamber and the suction side; and
    wherein the fracture structure is configured to fail when a predetermined force is applied to the tip such that the tip separates from a remainder of the body.

* * * * *